May 20, 1941.  A. J. NICHOLAS  2,242,980
APPARATUS FOR MEASURING BOWLERS' GRIPS
Filed May 13, 1940
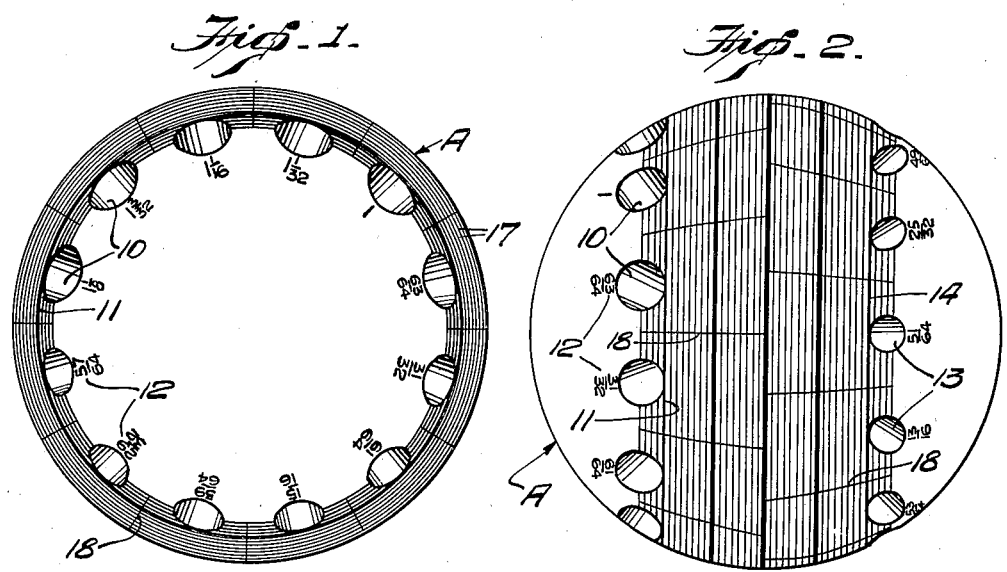
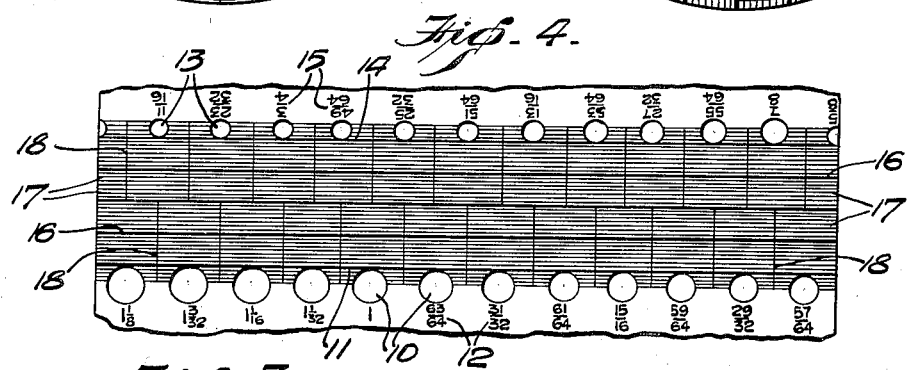
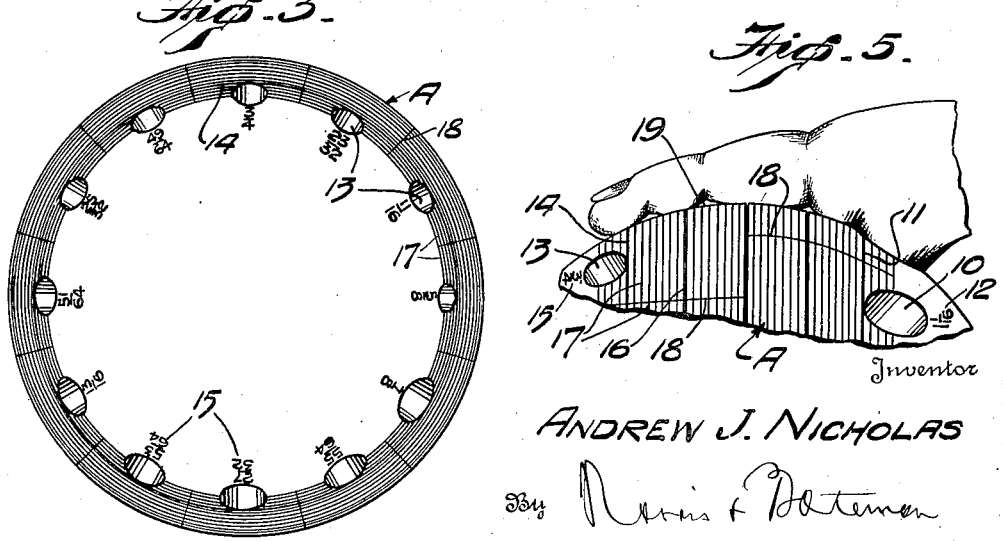
Inventor
ANDREW J. NICHOLAS
By Norris & Bateman
Attorneys Patented May 20, 1941

2,242,980

UNITED STATES PATENT OFFICE 2,242,980

APPARATUS FOR MEASURING BOWLERS' GRIPS

Andrew J. Nicholas, Philadelphia, Pa., assignor to The Luzerne Rubber Company, Trenton, N. J., a corporation of New Jersey Application May 13, 1940, Serial No. 334,956

6 Claims. (Cl. 33—174)

The present invention relates to methods and apparatus for measuring bowlers' grips, more particularly methods and apparatus for accurately determining the proper diameter of the holes to be drilled in the ball for any given bowler, and also the proper distance between the holes, to suit the span of the bowler.

In bowling games involving the use of a large ball, such as ten-pins and the like, it is customary for the seasoned bowler to purchase a ball and have it bored to suit his "grip," this term being employed herein to denote the proper sized thumb and finger openings and also the proper span or the distance between the thumb and finger openings, measured over the circumference of the ball. Since bowling balls are comparatively expensive it is important to determine the grip as accurately as possible before boring the ball, and even then the holes often do not suit the bowler's grip and must be discarded.

Although devices have been heretofore proposed for measuring bowlers' grips, some of them are open to the objection that they merely measure the bowler's span and do not take account of the proper size openings for the thumb and fingers. Other devices of the prior art afford some degree of measurement of both thumb and finger opening size and the bowler's span, but they are of rather complicated and costly construction and involve movable parts, which, even when skillfully manipulated, do not yield results having the desired degree of accuracy.

It is accordingly the primary object of this invention to provide novel methods and apparatus for measuring the grip of a bowler, and which will accurately measure both the span and diameters of the thumb and finger openings.

Another important object of the invention is to provide a novel grip measuring device of simple rugged design, embodying no moving parts, and yet which will accurately determine both the size of openings to be bored in the ball and the spacing of the holes, in a simple operation which requires no skill on the part of the operator.

A further object is to provide a grip measuring device which is so designed that both the size of the thumb opening and the span may be accurately determined in a single operation.

Further objects will become apparent as the specification proceeds in conjunction with the annexed drawing, and from the appended claims.

In the drawing:

Figure 1 is an elevational view of a device embodying my invention and showing the thumb openings;

Figure 2 is a side elevational view of the device of Fig. 1 as it appears when viewed from the left-hand side of that figure;

Figure 3 is a view similar to Fig. 1, but shows the other side of the device, containing the finger openings;

Figure 4 is a development of the hole portion of the device, showing the relationship between the span measuring scale and the holes; and Figure 5 is a fragmental side elevational view showing how the span is measured with the device of Figs. 1 to 4 inclusive.

Referring to the drawing, wherein like reference characters have been employed to designate like parts throughout the several views, my device preferably assumes the shape of a ball A, made of hard rubber or any other suitable material, having a radius of curvature equal to that of the ball for which the bowler is to be measured.

A plurality of preferably radially directed thumb-holes or openings 10 (Fig. 1) are bored or otherwise formed in the ball. As seen in Fig. 1 the holes are so located that they are all tangent to a common circular line 11, for a purpose that will presently appear. The diametrical size of each hole is preferably designated on the ball, by indicia 12 adjacent each hole, which in the present instance express the sizes in inches.

A second row of finger holes 13 (Fig. 3) are formed in the ball, and they are all preferably tangent to a circular line 14, and their sizes are denoted by indicia 15. As seen in Fig. 2, lines 11 and 14 are parallel, that is, the rows, though made up of different sized holes, are nevertheless substantially parallel. This is readily apparent from Fig. 3, which is a development of the equatorial portion of the ball containing the thumb and finger openings. Also, the holes of one row are preferably staggered with respect to the holes of the other row, to provide a smooth surface upon which the fingers may rest when the span is being determined.

The space between the two rows of openings is divided into inches and fractions by lines 16 and 17 respectively, which are disposed parallel to each other and to lines 11 and 14. The latter are disposed a definite number of inches apart, for a reason to be pointed out hereinafter. Between each adjacent pair of openings in each row is a line 18, which as seen in Fig. 4 intersects each line 16 and 17 at an angle of ninety degrees.

The novel method of the invention is preferably carried out as follows.

The bowler whose grip is to be measured inserts his finger into openings 13 until one is found in which it properly fits. Indicia 15 is then read, which gives the proper diametrical size. The thumb is then inserted into the various holes 10 until one is found in which it properly fits, and indicia 12 is read, to obtain the proper diametrical size. In fitting both the finger and thumb the hole should in no case be large enough to allow the knuckle at the second joint to enter the hole.

The span is obtained as follows: The thumb is inserted in the previously selected hole, with the hand stretched across lines 16 and 17. With the thumb still inserted, the palm and fingers are raised, tension is relaxed, and the palm and the finger to be measured are gently dropped to the surface again, keeping the finger on the line 18 which is opposite the selected thumb hole. The hand is now in the position on the ball shown in Fig. 5, in proper position for reading the indicated span.

In Fig. 5 the middle finger is seen to lie upon the surface of the ball carrying lines 16 and 17, and the indicated span for the middle finger is read at 19, directly under the second joint of the finger. The actual span, or spacing from the edge of the finger hole to the edge of the thumb hole is obtained by subtracting one half of the diameter of the selected finger hole from the indicated span. If it is desired to obtain the span for the ring finger, the same procedure is followed, except that the span is read under the second joint of the ring rather than the middle finger.

Accordingly, by the method just described, full information as to the bowler's grip may be obtained, and which enables the vendor to bore the proper size thumb and finger holes in the ball, with the proper span between them.

Although I have described holes 10 as thumb holes, it is to be understood that some bowler's thumbs may be of such small size as to fit one of the "finger" openings 13. It is for this reason that lines 18 are provided between each pair of adjacent thumb openings 10, so that when the thumb is inserted in one of openings 13 the span may be accurately obtained by laying the finger across lines 16 and 17 along one of the lines 18. For the same reason, the distance between lines 11 and 14, as measured over the face of the ball, is preferably an exact number of inches, so that irrespective of which direction the span is measured, it is indicated directly in inches and no interpolation is required.

From the foregoing it is apparent that I have provided a simple, rugged measuring device for bowlers' grips, which is inexpensive, involves no moving parts or complicated manipulative steps, and yet accurately measures both the finger and thumb size, and the span between the holes to be bored in the ball. Also, it is not necessary to follow any empirical rules as to the relationship between the span for the middle and ring fingers. It is determined directly.

Although I preferably locate holes 10 and 13 tangent to lines 11 and 14 respectively, it is to be understood that they may be arranged in other relationships without departing from the spirit of the invention. For instance, the centers of holes 10 and 13 may be arranged along lines 11 and 14 respectively and one half the selected finger opening size, and one half the selected thumb opening size subtracted from the indicated span, to obtain the actual span, and it is to be understood that the appended claims embrace my invention when it assumes this equivalent form.

I claim as my invention:

1. In a device for measuring the size of thumb and finger openings and also the span between the openings in a bowling ball, a ball shaped member having a row of thumb openings and a row of finger openings disposed substantially parallel to each other, said openings being of various sizes and having indicia cooperating therewith to denote the size of each opening, and a plurality of spaced parallel lines provided on said member between said rows of openings for indicating the span of a bowler's hand, and operable to measure equal incremental distances over the surface of said member from said openings, the openings of one row being staggered with respect to the openings of the other row, whereby a bowler's thumb may be inserted in an opening in one row and his finger outstretched over the surface of said member towards said other row and be disposed between two of the openings thereof.

2. In a bowler's grip measuring device, a ball having a row of thumb holes of different sizes, said ball also having a plurality of equally spaced parallel lines located adjacent and parallel to said row of thumb holes, one of said lines being tangent to all of said holes, whereby distances from any one of said thumb holes may be read on the surface of said ball.

3. In a bowler's grip measuring device, a ball having a pair of spaced parallel base lines thereon, a row of different size finger openings in said ball located tangent to one of said base lines, a row of different sized thumb openings in said ball located tangent to the other of said base lines, the surface of said ball between said base lines being divided into a plurality of equal parts, by a plurality of parallel lines, for measuring over the surface of said ball from any of said openings.

4. The device defined in claim 3, wherein the openings of one of said rows are staggered with respect to the openings of said other row.

5. The device defined in claim 3, wherein the openings of one of said rows are staggered with respect to the openings of said other row, and a finger-positioning line is located approximately midway between each pair of adjacent openings in each of said rows and is disposed normal to said first named lines.

6. The device defined in claim 3, wherein said rows of openings are spaced apart a distance materially greater than the bowler's span, so that when the bowler's thumb is inserted in an opening in one of said rows one or more of his fingers may be outstretched over the surface of the ball without contacting the openings of the other of said rows.

ANDREW J. NICHOLAS.